(12) United States Patent
Fujita et al.

(10) Patent No.: US 6,368,524 B1
(45) Date of Patent: Apr. 9, 2002

(54) OPTICAL ELEMENT MOLDING METHOD AND OPTICAL MATERIAL FOR MOLDING OPTICAL ELEMENT

(75) Inventors: Hiroaki Fujita; Hajime Yamanaka; Yasuhiko Sato, all of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/820,799

(22) Filed: Mar. 30, 2001

(30) Foreign Application Priority Data

Mar. 31, 2000 (JP) .................................. 2000-099579

(51) Int. Cl.[7] .............................................. B29D 11/00
(52) U.S. Cl. ........................................ 264/2.4; 264/2.7
(58) Field of Search ........................... 264/1.1, 2.3, 2.4, 264/2.7, 2.5; 425/808

(56) References Cited

U.S. PATENT DOCUMENTS 5,368,790 A * 11/1994 Greshes ...................... 264/2.4
5,718,850 A * 2/1998 Takano et al. .............. 264/2.7
5,759,457 A * 6/1998 Inoue et al. ................. 264/2.5

FOREIGN PATENT DOCUMENTS

JP            10-330121        * 12/1998

* cited by examiner

Primary Examiner—Mathieu D. Vargot
(74) Attorney, Agent, or Firm—Leydig, Voit & Mayer, Ltd.

(57) ABSTRACT

An optical element molding method for molding an optical element having an asymmetrical optically functional surface by pressing a heated preform in which, after a center part of a transfer surface of a molding die and a center part of the preform are brought into contact with each other, peripheries of the center part of the preform are brought into contact with the transfer surface, to transfer the form of the transfer surface to the preform. Consequently, the optically functional surface shape can be favorably transferred to the preform.

3 Claims, 3 Drawing Sheets

OPTICAL ELEMENT MOLDING METHOD AND OPTICAL MATERIAL FOR MOLDING OPTICAL ELEMENT

BACKGROUND OF THE INVENTION

1. Field of the Invention

The present invention relates to a method of molding an optical element such as an optical lens or a mirror, and an optical material for molding the optical element.

2. Related Background Art

Conventionally known as a technique for molding an optical element such as an optical lens or a mirror is press-molding. For example, as shown in FIG. 4, a preform A, which is an optical material, is disposed in a heated state at a molding position of a mold, and then an upper die B and a lower die C are moved so as to approach each other and carry out clamping, whereby an optical element is molded by the press-molding. When molding an optical element having a curved optically functional surface D by using the press-molding, the upper die B is brought into contact with the uppermost part E of the optically functional surface D, and then peripheries of the uppermost part E are brought into contact with and pressed against the upper die B, whereby the optical element is molded.

The molding method mentioned above, however, may be problematic in that molding cannot be carried out favorably when the optically functional surface of the optical element to be molded is an asymmetrical curved surface.

For example, as shown in FIG. 5, there is a case where the optically functional surface D is a curved surface which is asymmetrical about the center X of the optical element, and the uppermost part E of the optically functional surface D is not located at the center part F of the optically functional surface D. In this case, if the upper die B is brought into contact with the uppermost part E, and then peripheries of the uppermost part E are brought into contact with and pressed against the upper die B, the preform A will flow from the uppermost part E to its peripheries upon pressing (as indicated by arrows in FIG. 5).

In this case, while the form of optically functional surface is fully transferred to a region G between the uppermost part E and the end part closer thereto, it may not sufficiently be transferred to a region H on the opposite side between the uppermost part E and the end part farther therefrom, whereby air voids may occur in the region H.

SUMMARY OF THE INVENTION

For eliminating the problem mentioned above, it is an object of the present invention to provide an optical element molding method and an optical material for molding an optical element, which can favorably transfer an optically functional surface.

For achieving such an object, the present invention provides an optical element molding method comprising the step of pressing a heated optical material so as to mold an optical element having an asymmetrical optically functional surface; wherein a center part of a transfer surface of a molding die and a center part of the optical material are brought into contact with each other, and then a periphery of the center part of the optical material is brought into contact with the transfer surface so as to transfer a form of the transfer surface to the optical material.

Also, the present invention provides an optical material for molding an optical element, which is used for molding an optical element having an asymmetrical optically functional surface by pressing a heated optical material; wherein a tangential direction of a center part of a surface pressed against a transfer surface of a molding die is parallel to a tangential direction of a center part of the transfer surface.

In accordance with the present invention, when a molding die presses an optical material, the center part of the transfer surface of the molding die initially comes into contact with the center part of the optical material, and then the transfer surface gradually comes into contact with peripheries of the center part of the optical material, whereby the form of the transfer surface is transferred to the optical material. Therefore, the transfer surface of the molding die is favorably transferred to the pressing surface of the optical material without losing its balance, whereby air voids are prevented from occurring in the pressing surface of the optical material.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
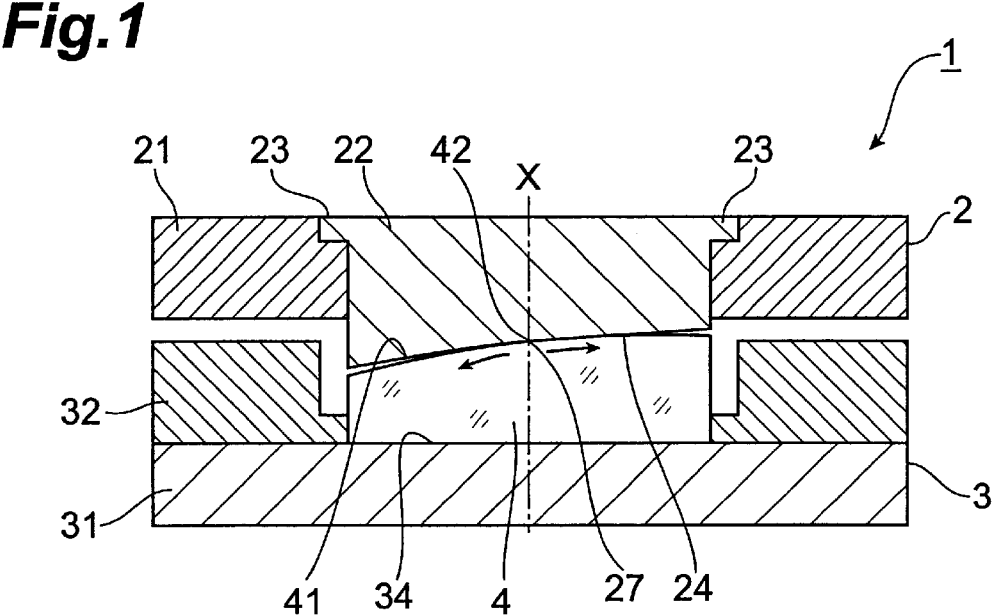
FIG. 1 is an explanatory view of the optical element molding method and optical material for molding an optical element in accordance with an embodiment of the present invention.

In the following, an embodiment of the present invention will be explained with reference to the accompanying drawings. Among the drawings, constituents identical to each other will be referred to with numerals or letters identical to each other without repeating their overlapping explanations. Ratios of dimensions in the drawings do not always coincide with those explained.

FIG. 1 is an explanatory view for the optical element molding method and optical material for molding an optical element in accordance with an embodiment of the present invention. This embodiment explains a case where a mirror is molded as an optical element. This mirror has an asymmetrical optically functional surface. Here, "asymmetrical optically functional surface" refers to an optically functional surface whose surface form is not symmetrical about the center thereof. In this case, "asymmetrical optically functional surface" is not necessarily asymmetrical in all the directions as long as it is asymmetrical in a given direction including the center of the optically functional surface. Also, the optically functional surface may be either spherical or aspherical as long as it is asymmetrical.

As shown in FIG. 1, the optical element molding method in accordance with this embodiment is carried out by using a molding die 1. This molding die 1 comprises an upper die 2 and a lower die 3. The upper die 2 is constituted by a die plate 21 and a core 22. The lower die 3 is constituted by a die plate 31 and a core 32.

The upper die 2 is a die on the stationary side. For example, the die plate 21 of the upper die 2 is attached to a stationary platen of a mold-clamping apparatus. The core 22 is fitted into the die plate 21 so as to be slidable in the mold-clamping direction. The upper part of the core 22 is formed with a flange 23, so as not to fall out of the die plate 21. The surface of core 22 opposing the lower die 3 is formed with a transfer surface 24. The transfer surface 24 is formed as a concave surface which is identically the reversal of an optically functional surface of the mirror to be molded.

The lower die 3 is a die on the movable side. For example, the die plate 31 of the lower die 3 is attached to a movable platen of the mold-clamping apparatus. Therefore, the die plate 31 is adapted to freely advance and retract with respect to the upper die 2. A middle plate 32 is attached to the surface of die plate 31 opposing the upper die 2. The middle plate 32 is fastened by screwing, for example. The middle plate 32 is formed with a recess 34 at a position opposing the transfer surface 24 of the core 22. Together with the transfer surface 24 of the core 22, the recess 34 defines a molding space.

Figure 2:
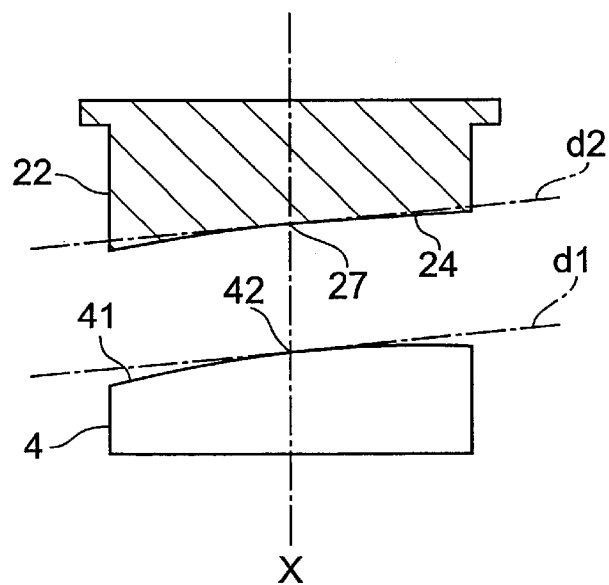
FIG. 2 is an explanatory view of the optical material for molding an optical element shown in FIG. 1.

FIG. 2 shows the optical material in accordance with this embodiment.

As depicted, a preform 4, which is the optical material in accordance with this embodiment, is disposed in the molding space between the upper die 2 and the lower die 3, and is molded into a mirror, which is an optical material, as being pressed by the upper die 2 and the lower die 3. The preform 4 has an asymmetrical pressing surface 41 on the upper side. Here, "asymmetrical" refers to a state where the surface form is not symmetrical about the center X of the pressing surface 41.

The pressing surface 41 is a convex curved surface, whose radius of curvature is smaller than that of the transfer surface 24 of the core 22 of the upper die 2. Also, the tangential direction d1 of the center part 42 of the pressing surface 41 is parallel to the tangential direction d2 of the center part 27 of the transfer surface 24. Consequently, when the transfer surface 24 and the pressing surface 41 of the preform 4 come into contact with each other upon clamping, the center part 27 of the transfer surface 24 and the center part 42 of the pressing surface 41 initially come into contact with each other, and then their peripheries gradually come into contact with each other.

Here, when the pressing surface 41 and the transfer surface 24 are aspherical, "radius of curvature is smaller" means that the radius of curvature is smaller in their center parts and their surroundings. The "center part" of the transfer surface 24 and pressing surface 41 includes their substantially center parts, e.g., parts deviating from the center position X of the transfer surface 24 and pressing surface 41 by 20% to 30% of the total size.

The optical element molding method in accordance with this embodiment will now be explained.

First, the movable platen of the mold-clamping apparatus is moved away from the stationary platen, so as to separate the lower die 3 from the upper die 2, and the preform 4 is disposed at a molding position between the lower die 3 and the upper die 2. The preform 4 is placed at the recess 34 of the middle plate 32 of the lower die 3, and is positioned by this placement. At this time, the upper die 2 and the lower die 3 are heated, whereby the preform 4 is set to a high-temperature state.

In this state, as shown in FIG. 1, the movable platen of the mold-clamping apparatus is moved toward the stationary platen, so as to shift the lower die 3 toward the upper die 2. The lower die 3 is guided by a member such as a drum, so as to approach the upper die 2.

Figure 3:
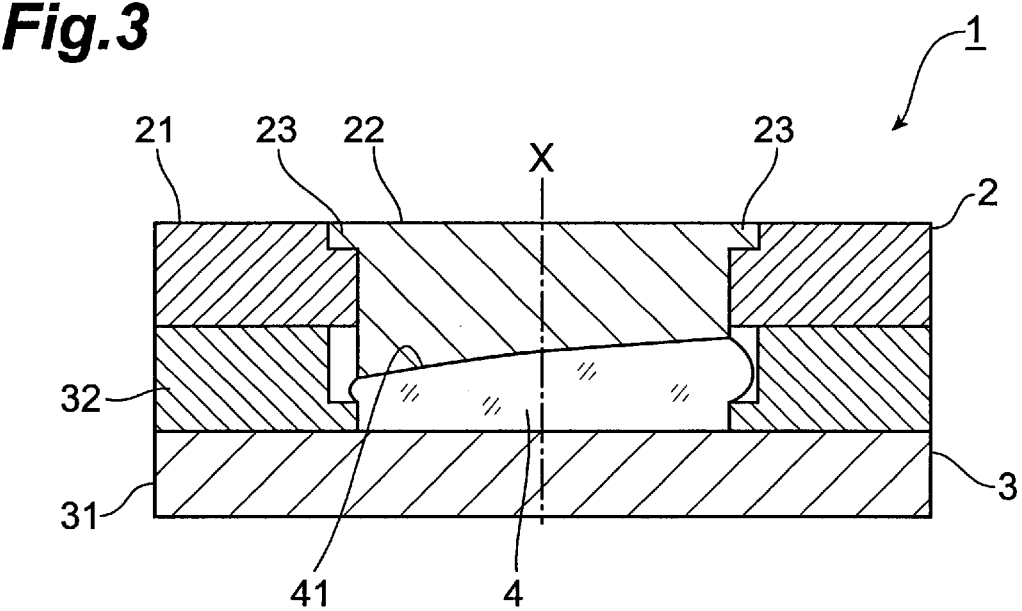
FIG. 3 is an explanatory view of the optical element molding method in accordance with the above-mentioned embodiment.
Figure 4:
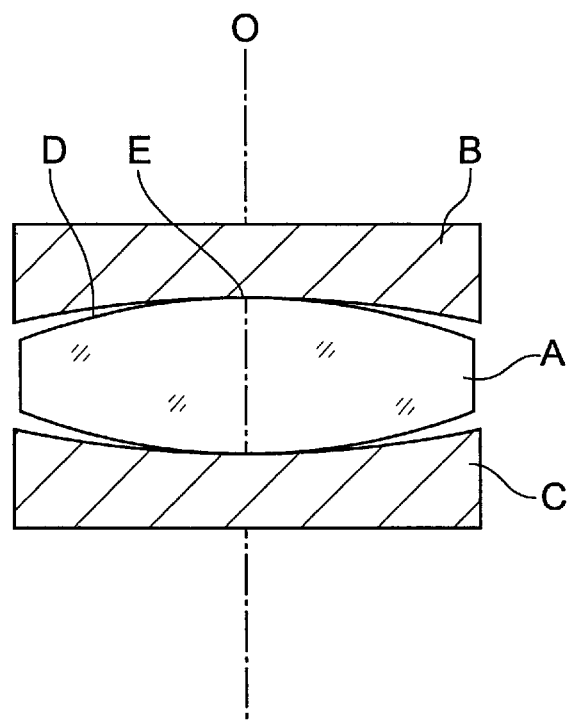
FIG. 4 is an explanatory view of a conventional technique.
Figure 5:
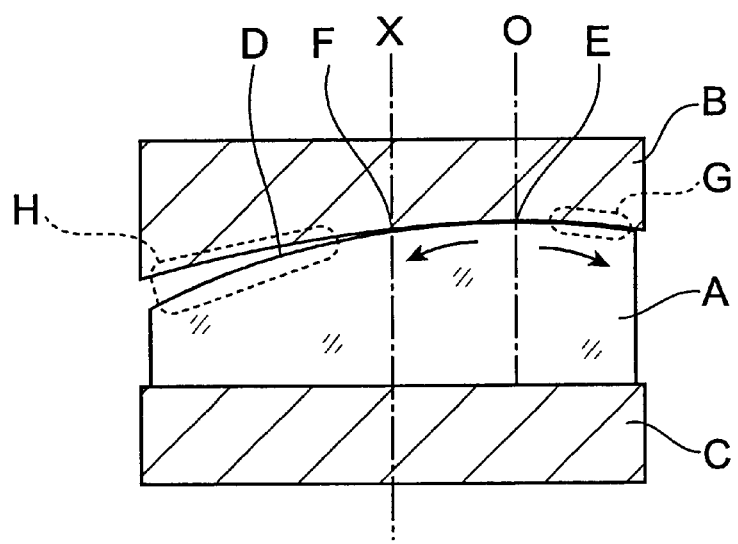
FIG. 5 is an explanatory view of a conventional technique.

Subsequently, the center part 42 of the pressing surface 41 of the preform 4 comes into contact with the center part 27 of the transfer surface 24 of the core 22, and then peripheries of the center part 42 of the pressing surface 41 of the preform 4 gradually come into contact with the transfer surface 24 as shown in FIG. 3.

Therefore, in the pressing surface 41 of the preform 4, the material flows sidewise with a favorable balance from the center part 42. As a consequence, no air voids are generated in the pressing surface 41 of the preform 4, whereby the form of the transfer surface 24 can favorably be transferred without being lopsided.

After the pressing surface 41 of the preform 4 is fully pressed against the transfer surface 24 of the core 22, the movable platen is moved away from the stationary platen, so as to separate the lower die 3 from the upper die 2, thereby opening the mold. Thereafter, the molded preform 4, i.e., mirror, is taken out from the lower die 3, whereby the molding operation of the mirror as the optical element is completed.

In the optical element molding method and optical material for molding an optical element in accordance with this embodiment, as in the foregoing, air voids are hard to occur in the pressing surface 41 of the preform 4, which is an optical material, whereby the form of the transfer surface 24 can favorably be transferred as the optically functional surface of the optical element.

Though a case where a mirror is molded as an optical element is explained in this embodiment, the optical element molding method and optical material for molding an optical element in accordance with the present invention are not restricted thereto, and other optical devices such as a lens having optically functional surfaces on both sides may also be molded thereby.

While the above-mentioned embodiment explains a case where the upper die 2 and lower die 3 are dies on the stationary side and the movable side, respectively, and the lower die 3 is advanced and retracted with respect to the upper die 2, the optical element molding method in accordance with the present invention is not restricted thereto. For example, the upper die 2 and lower die 3 may be dies on the movable side and the stationary side, respectively, and the upper die 2 may be advanced and retracted with respect to the lower die 3.

Though the above-mentioned embodiment explains a case where the pressing surface of the preform 4 is a convex curved surface whose radius of curvature is smaller than that of the transfer surface 24 of the core 22, the optical element molding method and optical material for molding an optical element in accordance with the present invention are not restricted thereto. For example, the pressing surface of the preform 4 may be a concave curved surface whose radius of curvature is greater than that of the transfer surface 24 of the core 22.

When the molding die presses an optical material in the present invention, as explained in the foregoing, the center part of the transfer surface of the molding die initially comes into contact with the center part of the optical material, and then the transfer surface gradually comes into contact with peripheries of the optical material. As a consequence, the optical material flows sidewise from the center part with a favorable balance in the pressing surface of the optical material, so that air voids are hard to occur in the pressing surface of the optical material, whereby the transfer surface of the molding die can favorably be transferred as an optically functional surface.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical element molding method comprising pressing a heated optical material to mold an optical element from the optical material, the optical element having an asymmetrical optically functional surface that is asymmetrical along at least one radial direction extending from a center of the optically functional surface, the method including bringing a center part of a transfer surface of a molding die, the transfer surface having a form, and a center part of a surface of a heated optical material into contact with each other, and thereafter, bringing a periphery of the center part of the heated optical material into contact with the transfer surface, thereby transferring the form of the transfer surface to the heated optical material and forming an optical element with an asymmetrical optically functional surface that is asymmetrical along at least one radial direction extending from the center of the optically functional surface.

2. The optical element molding method according to claim 1, including pressing the heated optical material so that a tangential direction of the center part of the surface of the heated optical material is pressed against the transfer surface of the molding die, parallel to a tangential direction of a center part of the transfer surface.

3. An optical element molding method comprising pressing a heated optical material to mold an optical element from the heated optical material and having an asymmetrical optically functional surface, the method including bringing a center part of a transfer surface of a molding die, the transfer surface having a form, and a center part of a surface of a heated optical material into contact with each other, and thereafter, bringing a periphery the center part of the heated optical material into contact with the transfer surface of the molding die and pressing the heated optical material so that a tangential direction of the center part of the surface of the heated optical material is pressed against the transfer surface of the molding die, parallel to a tangential direction of a center part of the transfer surface to transfer the form of the transfer surface to the heated optical material.

* * * * *